70. LOCKS,
322
BEST AVAILABLE COPY
(93.)
JAMES SARGENT.
Improvement in Permutation Locks.
No. 4,696. Reissued Jan. 2, 1872.
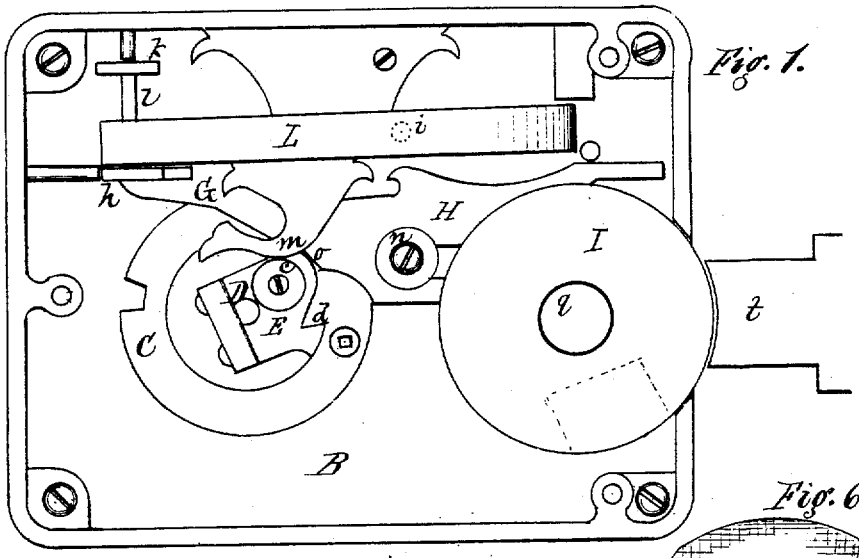
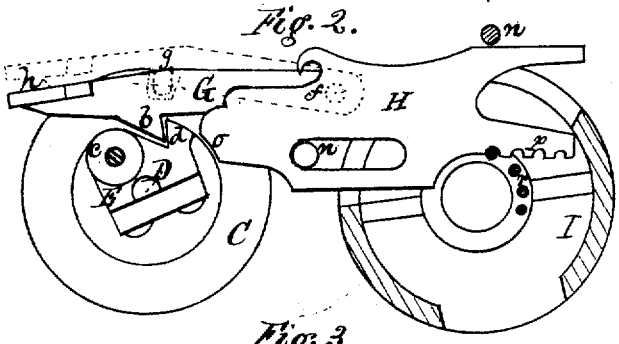
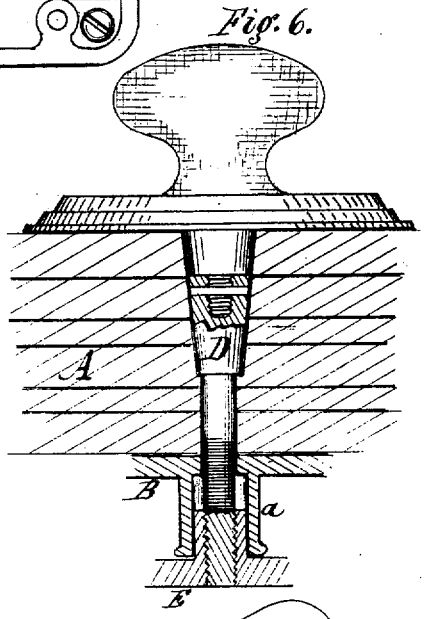
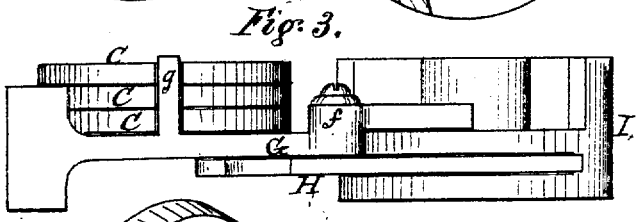
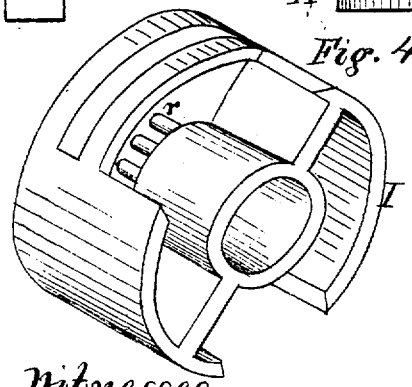
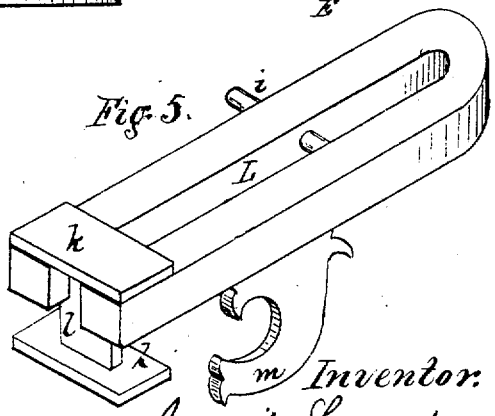
Witnesses.
James L. Morris.
Parker H. Sweet Jr.
Inventor.
James Sargent
per Burke Fisher & Ingold
attys
AM. PHOTO-LITHOGRAPHIC CO. N.Y. (OSBORNE'S PROCESS.)

322

UNITED STATES PATENT OFFICE.

JAMES SARGENT, OF ROCHESTER, NEW YORK.

IMPROVEMENT IN LOCKS.

Specification forming part of Letters Patent No. 57,574, dated August 28, 1866; Reissue No. 4,696, dated January 2, 1872.

Specification describing certain Improvements in Combination Locks, invented by JAMES SARGENT, of Rochester, in the county of Monroe and State of New York.

*Nature of the Invention.*

My invention consists in combining with the ordinary combination wheels, and the other working parts of a combination lock which has no sliding lock-bolt, a bolt turning on a pivot or bearing which is so isolated or removed from contact with the said wheels as to receive any pressure or strain which may be applied through the separate bolt-work of the safe or vault door and cut off the communication between the bolt-work of the door and the wheels or fence-lever of the lock, whereby the position of the slots in the wheels can be determined and the lock "picked," as can be done in most cases where the ordinary sliding bolt is used without some mechanical device to prevent.

*General Description.*

In the drawings, Figure 1 is an elevation of my improved lock with the back plate removed; Figs. 2 and 3, an elevation and top view, respectively, of the pivoted bolt, the combination wheels, the cam, and the lever-work that connects them; Fig. 4, a perspective view of the pivoted bolt; Fig. 5, a similar view of the magnet and armatures; Fig. 6, a view showing the manner of applying the spindle and cam to a safe or vault door.

A represents the plating of a safe-door, and B the case of the lock which is applied thereto. C C C are the combination wheels, and D the operating-spindle. The spindle passes through a hollow stud, *a*, of the case, and has screwed upon its inner end the cam E, as shown most clearly in Fig. 6. The wheels themselves rest on the stud *a*. I is the bolt, turning on a pivot or bearing, *q*. Its location is such as to rest closely in the rear of the stem *t* of the heavy bolt-work of the door and to hold it out when in one position, but to allow it to retract to free the bolt-work when in the other position, said bolt I turning on its pivot or bearing to allow this to be done. H is a sliding bar which gives motion to the bolt as it is thrown forward or backward, being connected together by cog-teeth *p r*. The bar slides on studs *n n*, by which it keeps its horizontal position. G is a lever, pivoted at *f* to bar H and serving to throw the latter back. It has a hook, *b*, Fig. 2, which engages with the bit *d* of the cam to draw the bar back. The forward motion is given by the cam striking the end *o* of the bar H. L is a magnet, of the form shown in Fig. 5, which is suspended on a pivot, *i*. Its open end rests between armatures *h k*, which are separated by a brass pendant, *l*. The armature *h* is attached to the end of lever G. When the magnet is in contact with the lower armature, *h*, the dog *g* will be held away from the wheels; but when raised and brought in contact with the upper armature, *k*, the lever is released and the dog is then allowed to fall into the notches of the wheels to release the bolt. The magnet is raised by a roller, *c*, of the cam, which strikes a bearing, *m*, of the magnet.

In general principle the magnet is the same as that covered by the patent of Sargent and Covert, May 2, 1865; but the construction and arrangement of the magnet and armatures are much simpler and more effective, and constitute one feature of my present invention.

An important feature in my invention is the employment of the bolt I turning on a pivot or bearing instead of the sliding bolt heretofore in use. It is isolated, so to speak, from the combination wheels and the other main working parts of the lock, and therefore any strain which is brought to bear upon it by the heavy bolt-work will be expended on the bolt itself, and not upon the wheels. In the old form of lock the sliding bolt extends back so as to connect with or come near to the wheels, and any strain thereon is liable to disarrange the lock-works.

Another important advantage of the isolation of the bolt is that it increases the difficulty of "picking" by being removed from all contact with the wheels. A common mode of picking ordinary locks is to force the bolt back so as to get a contact with it and the edges of the wheels, by which their position is ascertained. In my lock this cannot occur, as the bolt simply turns on its bearing or pivot and no back action can bring it or the lever-work against the wheels.

The bolt may not only be of the circular form shown in the drawings, but of segmental form, which will serve the same purpose.

I am aware that the combination wheels themselves have been made with notches and so arranged that the ordinary sliding bolt which rests against their edges may fall back and within the notches when they are all set. Such is not the equivalent of my invention, as my express purpose is to avoid all contact of the bolt with the edges of the wheels.

*Claims.*

What I claim, and desire to secure by Letters Patent, is—

1. I claim, in a combination lock for safe or vault doors, a bolt, I, which turns on a pivot or bearing, when said bolt I is used in a lock having no ordinary sliding lock-bolt, and in connection with the separate bolt-work of the door, and so arranged as to receive the pressure of the said bolt-work without transmitting it to the wheels or other equivalent works of the lock.

2. In a combination lock for safe and vault doors, I claim the combination of the bolt I, bar H, and cog-connection *p r*, when said bolt I turns on a pivot or bearing and receives the pressure of the bolt-works situated outside the lock-works and intervenes between the bolt-work and the wheels.

3. I claim, in combination with the bolt I, the bar H and lever G, arranged and operating as herein set forth.

4. I claim, in combination with the vibrating magnet L, the armatures *h k* and pendant *l*, arranged as herein described.

5. I claim the combination and arrangement of the wheels C C, cam E, lever G, bar H, and bolt I, as herein described.

In testimony whereof I have hereunto set my hand this 16th day of September, 1871.

JAMES SARGENT.

Witnesses:

L. F. MUNGER,

R. F. OSGOOD.